United States Patent
Pendleton et al.

(10) Patent No.: US 10,464,464 B2
(45) Date of Patent: Nov. 5, 2019

(54) ADJUSTABLE RECEIVER MOUNTED VEHICLE RAMP SYSTEM

(71) Applicants: David A. Pendleton, New Holstein, WI (US); Steven P. Schwarz, New Holstein, WI (US)

(72) Inventors: David A. Pendleton, New Holstein, WI (US); Steven P. Schwarz, New Holstein, WI (US)

(*) Notice: Subject to any disclaimer, the term of this patent is extended or adjusted under 35 U.S.C. 154(b) by 109 days.

(21) Appl. No.: 15/336,142

(22) Filed: Oct. 27, 2016

(65) Prior Publication Data

US 2017/0113887 A1 Apr. 27, 2017

Related U.S. Application Data

(60) Provisional application No. 62/246,828, filed on Oct. 27, 2015.

(51) Int. Cl.
   *B60P 1/43* (2006.01)

(52) U.S. Cl.
   CPC .................... *B60P 1/43* (2013.01)

(58) Field of Classification Search
   CPC .......... A61G 3/06; A61G 3/061; B65G 69/28; B65G 69/287; B60P 1/43; B60P 1/435
   See application file for complete search history.

(56) References Cited

U.S. PATENT DOCUMENTS

| | | | | |
|---|---|---|---|---|
| 5,649,732 A | * | 7/1997 | Jordan | B60P 1/43 296/26.1 |
| 6,250,874 B1 | * | 6/2001 | Cross | B60P 1/43 296/61 |
| 6,533,337 B1 | * | 3/2003 | Harshman | B60P 1/43 224/403 |
| 8,051,519 B1 | * | 11/2011 | Adams | B60P 1/43 14/69.5 |
| 8,302,235 B1 | * | 11/2012 | Bailie | B60P 1/43 14/69.5 |
| 9,676,315 B1 | * | 6/2017 | Davis | B60P 1/43 |
| 9,745,153 B2 | * | 8/2017 | Pelzer | B65G 69/30 |
| 9,919,754 B2 | * | 3/2018 | Chamoun | B62D 63/061 |
| 2006/0208456 A1 | * | 9/2006 | Weaver | B60D 1/06 280/491.5 |
| 2013/0045069 A1 | * | 2/2013 | Day | B60P 1/43 414/537 |
| 2013/0343847 A1 | * | 12/2013 | Freeman | B60P 1/435 414/523 |
| 2014/0338137 A1 | * | 11/2014 | Stokes | B60D 1/06 14/71.1 |

* cited by examiner

*Primary Examiner* — Glenn F Myers
(74) *Attorney, Agent, or Firm* — Boyle Fredrickson, S.C.

(57) ABSTRACT

An adjustable vehicle loading ramp system that removably cooperates with a vehicle mounted hitch receiver and provides a rearward directed supplemental hitch receiver. The loading ramp system includes a pair of ramp sections that are movably connected to a mounting system to provide a plurality of lateral distances between the respective ramp sections. The assembly is stowable to achieve a compact orientation of the loading ramp system relative to a tailgate of a vehicle and an in-use position wherein the ramp sections can be deployed to provide a supported incline into the bed or cargo area of the underlying vehicle.

20 Claims, 12 Drawing Sheets

ADJUSTABLE RECEIVER MOUNTED VEHICLE RAMP SYSTEM

CROSS REFERENCE TO RELATED APPLICATIONS

This application claims priority to U.S. Provisional Patent Application Ser. No. 62/246,828 filed on Oct. 27, 2015 titled "Adjustable Receiver Mounted Vehicle Ramp System" the disclosure of which is incorporated herein.

BACKGROUND OF THE INVENTION

The present invention relates to a vehicle ramp system and method of using ramp systems, and more particularly, to a ramp assembly that is constructed to cooperate with a vehicle hitch receiver and can be adjusted to accommodate use of the ramp assembly for loading and unloading of vehicles and accessories having different shapes and wheel base configurations.

Many known vehicle mounted ramp systems facilitate loading and unloading of a cargo area associated with an underlying vehicle. Some such systems simply include one or more rigid ramp sections that simply rest upon a transport vehicle during loading and unloading operations. Such systems are less than desirable and can present instances of undesired separation between the discrete ramp sections and the underlying vehicle. Such separation can be particularly problematic during loading and unloading operations wherein the separation is caused by unexpected translation of the vehicle and/or the discrete ramps during loading and unloading operations. Still further, use of such ramp systems commonly require independent transport of the discrete ramp sections to facilitate loading and unloading operations at different locations. Such systems also commonly present aggressive loading and unloading angles which render the ramp systems unusable for many manual or unpowered loading activities and present instances of tipping or rolling of the devices being loaded and/or unloaded.

Having recognized some of the shortcomings of such independent ramp systems, others provide ramp systems that are configured to be rigidly secured to frame members of an underlying vehicle via one or more fasteners or the like. Such configurations can detract from or interfere with other uses of the underlying vehicle that may require repeated or expeditious removal and association of the ramp system with the underlying vehicle to facilitate other uses of the underlying vehicle. Still further, such configurations detract from the ability to use the ramp systems with other vehicles or vehicles having configurations that are less suited to accommodate cooperation with the underlying ramp system. In an effort to improve the efficiency associated with use of ancillary ramp systems that can be associated with an underlying vehicle, some such systems are configured to cooperate with a receiver that is commonly permanently secured to an underlying vehicle, such as a pick-up truck or the like. Although such configurations improve usability of the ramp system with various vehicles and improve the efficiency associated with repeatedly associating and removing the ramp system relative to the vehicle, such systems also commonly suffer from various drawbacks.

Some vehicle ramp systems provide a receiver supported ramp assembly wherein one of more discrete ramp sections are movably secured to a frame assembly that removably cooperates with a receiver secured to an underlying vehicle. When provided as a single ramp section, such ramp systems are heavy and detract from transport and/or storage of the ramp system when not supported by a vehicle. When provided in two ramp section configurations, such ramp systems can suffer from various additional drawbacks. Many such systems include ramp sections that are movable but otherwise permanently affixed to the underlying ramp support structures. That is, such ramp systems commonly include ramps that provide a discrete operational width. Such configurations detract from use of the ramp systems during loading and unloading operations with wheeled vehicles and/or accessories, such as yard and garden equipment, rototillers, wood splitters or the like, that commonly have variable wheel base widths that are substantially different than other off road equipment such as four wheelers, ATV's (all-terrain vehicles), UTV's (utility task or terrain vehicles), or the like.

Still further, other receiver mounted ramp systems suffer from drawbacks associated with use of the underlying vehicle or interfere with the intended operations thereof. Some such systems require removal of the tailgate when the ramp system is associated with the vehicle. Still other vehicle ramp systems cooperate with the vehicle in a manner wherein one or more ramp sections can be stowed or oriented in a generally vertical orientation or deployed to extend generally rearward and downward relative to the vehicle cargo area. Such configurations generally frequently require removal of the tailgate or are oriented substantially rearward of the vehicle when oriented in a stowed configuration to facilitate operation of the tailgate. Such configurations detract from a compact vehicle presentation when the ramp system is associated therewith and can interfere with placement of the vehicle and associated ramp system with covered storage or parking areas. Still further, some such systems fail to adequately address differences in vehicle body styles between both brands and model years associated with the underlying vehicle. Failure to attend to the nuances between vehicle brands and model years can result in unintended contact between the tailgate and the vehicle mounted ramp system and lead to unintended damage to the finish and/or appearance of the underlying vehicle. Such considerations detract from the efficiency and desirability associated with use of such vehicle mounted ramp systems and limits use of the vehicle ramp systems between different makes and models of vehicles.

A further concern relates to the security associated with ownership and use of vehicle mounted ramp systems. Use of such systems frequently relies on the ramp system being associated with an underlying vehicle when the vehicle and respective ramp system are unattended. Such occurrences can occur at destinations between loading and unloading activities or even during the loading and unloading operations when the load vehicle and the vehicle or equipment being loaded are not positioned to close proximity to one another. When left unattended, the vehicle ramp systems, or removable portions thereof, due in large part to the convenience with which such systems are configured to be quickly and efficiently associated with or removed from an underlying vehicle, leaves the ramp system, or discrete portions thereof, susceptible to vandalism, misappropriation, or theft.

Another concern associated with use of vehicle receiver mounted loading accessories relates to the utility associated with use of the underlying vehicle when such loading systems are engaged with the vehicle. When a receiver mounted vehicle ramp system is engaged with a receiver of an underlying vehicle, the vehicle mounted receiver is rendered unusable for use with other vehicle receiver mounted accessories—such as cargo carriers, bike racks, delivery of additional ramp systems, novelty or other vehicle accessory features such as mock propellers, lights, steps, camping or other receiver mounted accessories, sway bar assemblies, hitch or ball mounts etc., or for towing of additional vehicles, such as trailers or the like. Concurrent transport of multiple vehicle receiver mounted accessories requires a portion of the cargo space defined by the vehicle be occupied by the additional receiver engaging accessory systems thereby detracting from efficient use of the underlying vehicle.

Therefore, there is a need for a vehicle ramp system that accommodates expeditious and secure association of a ramp arrangement with a load vehicle and secures respective ramp sections to the load vehicle in a secure and adjustable manner. There is a further need for a vehicle ramp system that is moveable between a loading orientation that provides a gradual load angle and a stowed orientation that secures the vehicle ramp system in close proximity to the load vehicle. There is a further need for a vehicle ramp system that provides stowed and loading orientations that accommodate different vehicle geometries and different stowed orientations that do not unduly interfere with operation of vehicle structures such as tail gates or load gates associated with the underlying vehicle. There is a further need for a vehicle receiver mounted ramp system that can accommodate securing of additional accessories to the underlying vehicle via the generally rigid and robust structure of the vehicle receiver structure when the ramp system is engaged therewith.

BRIEF DESCRIPTION OF THE INVENTION

The present invention discloses a vehicle receiver mounted ramp system that resolves one or more of the shortcomings disclosed above. One aspect of the invention discloses an adjustable vehicle ramp system for use with a towing vehicle that includes a mounting assembly, a support post, a horizontal cross bar, and a first and a second ramp section. The mounting assembly is mountable within a standard hitch receiver of a towing vehicle and can extend into a supplemental trailer hitch receiver such that the ramp system can be used simultaneously with a secondary towed load. The support post is rotatably affixed to the mounting assembly such that the post may be rotated between a stowed position in which the post is in a substantially vertical position and a second position in which the support post is rotated away from the vehicle to allow a tailgate or cargo doors to be opened.

A horizontal cross bar is connected to the support post. The horizontal cross bar is constructed to accept tubular members associated with a first ramp base section and a second ramp base section. The first and second ramp sections are generally mirror images of one another. Both ramp sections include a track and a tubular member with openings on either end thereof. The openings are offset from the center of the track and can be engaged with multiple mounting openings defined by the horizontal cross bar.

The first ramp section and the second ramp section may be adjusted laterally to align with a respective one of the mounting openings defined by the horizontal cross bar. Further still, the first ramp base section and the second ramp base section may be inverted or reversed, that is removed and switched to opposite lateral sides of the horizontal cross bar. As such, the same first ramp section and second ramp section may be used to accommodate vehicles of multiple wheel base dimensions.

Another aspect of the invention that is useable of combinable with one or more of the features or aspects above discloses a vehicle ramp system that removably cooperates with a vehicle mounted hitch receiver and includes a mounting assembly that is constructed to removably cooperate with the vehicle hitch receiver. The ramp system includes a first ramp and a second ramp that are supported by the mounting assembly such that the first ramp and the second ramp are pivotably attached to the mounting assembly. A supplemental vehicle hitch receiver is defined by the mounting assembly and is configured to receive a hitch such that the mounting assembly is disposed between the vehicle hitch receiver and the hitch.

A further aspect of the invention discloses a vehicle loading ramp system that includes a mounting assembly that can be releasably connected to a receiver secured to a vehicle. A support post assembly includes a first end portion that is pivotably connected to the mounting assembly such that the support post assembly can pivot between a stowed position wherein the support post assembly is oriented nearer a rear portion of a vehicle and a deployed position wherein the support post assembly is rotated away from the rear portion of vehicle. A cross member is attached to a second end portion of support post assembly that is generally opposite the first end portion of the support post. A first ramp section and a second ramp section are each connected to the cross member such that the first ramp section and the second ramp section are independently rotatable relative to the cross member.

Another aspect of the invention discloses a vehicle receiver supported ramp system that includes a mounting assembly that is constructed to removably cooperate with a vehicle hitch receiver. A support post is pivotally connected to the mounting assembly and a cross bar is connected to the support post at a location that is offset from the mounting assembly such that a first portion of the cross bar and a second portion of the cross bar are oriented on generally opposite lateral sides of the support post. A first ramp section and a second ramp section are each constructed to slideably and pivotably cooperate with each of the first portion and the second portion of the cross bar such that the first ramp section and the second ramp section can each be selectively engaged with one of the first portion and the second portion of the cross bar to define a plurality of wheel base dimensions defined by a distance between the first ramp section and the second ramp section when the ramp sections are engaged with the cross bar.

These and other aspects, features, and advantages of the present invention will be made apparent from the following detailed description and the drawings.

BRIEF DESCRIPTION OF THE DRAWING(S)

The drawings illustrate preferred embodiments presently contemplated for carrying out the invention and show various views of the adjustable receiver mounted vehicle loading ramp system or assembly according to the present invention.

Figure 1:
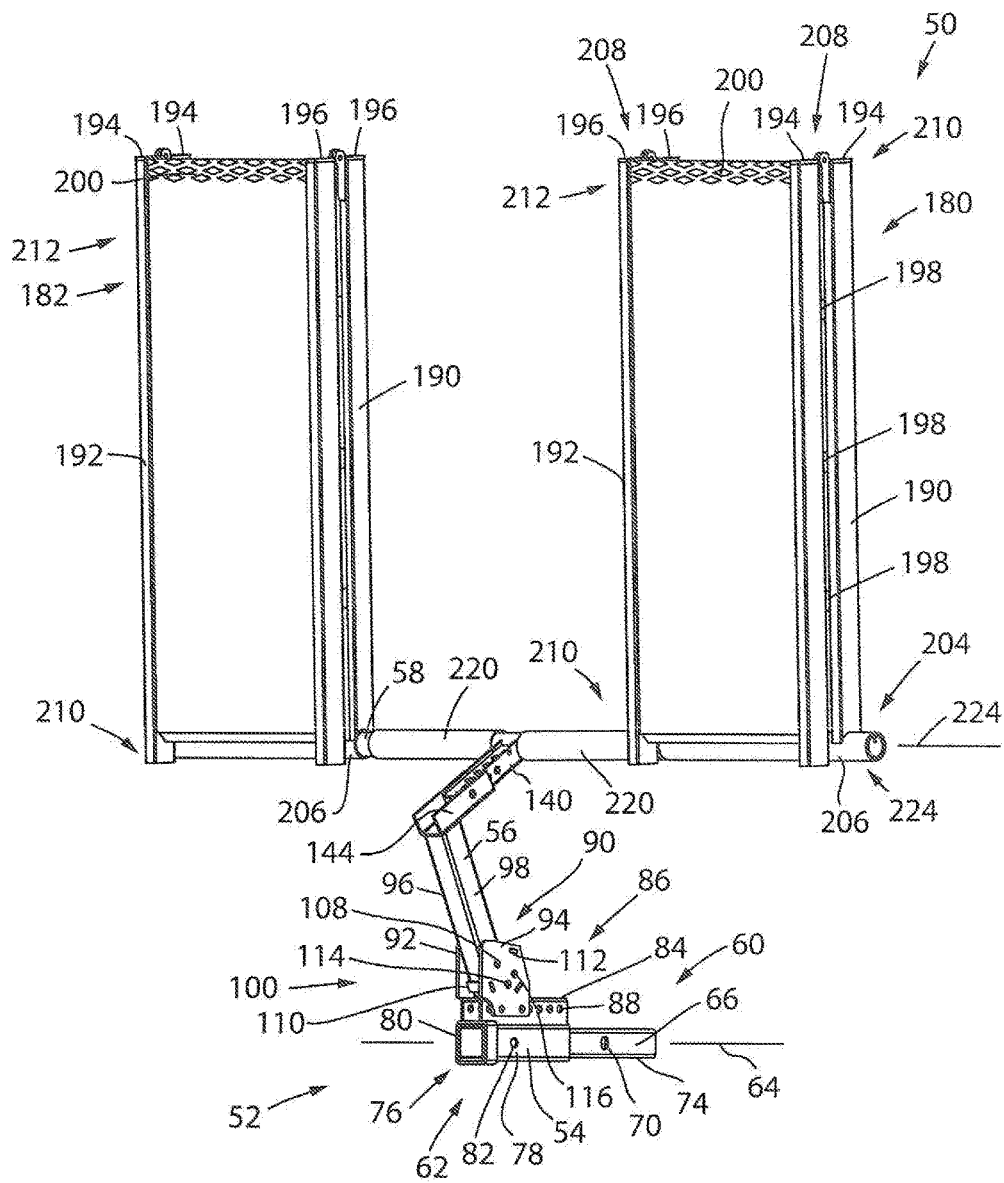
FIG. 1 is a rear perspective view of a vehicle ramp system according to the present invention.
Figure 8:
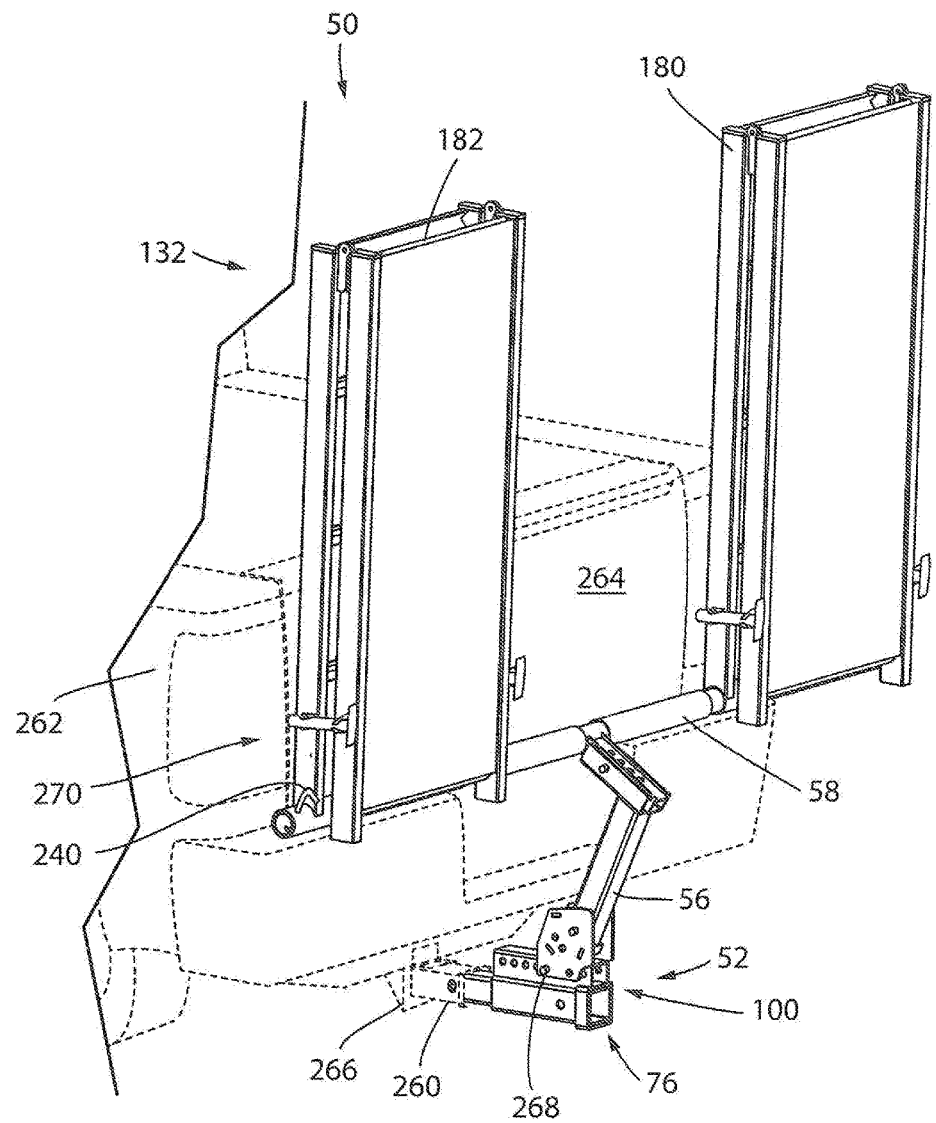
Figure 9:
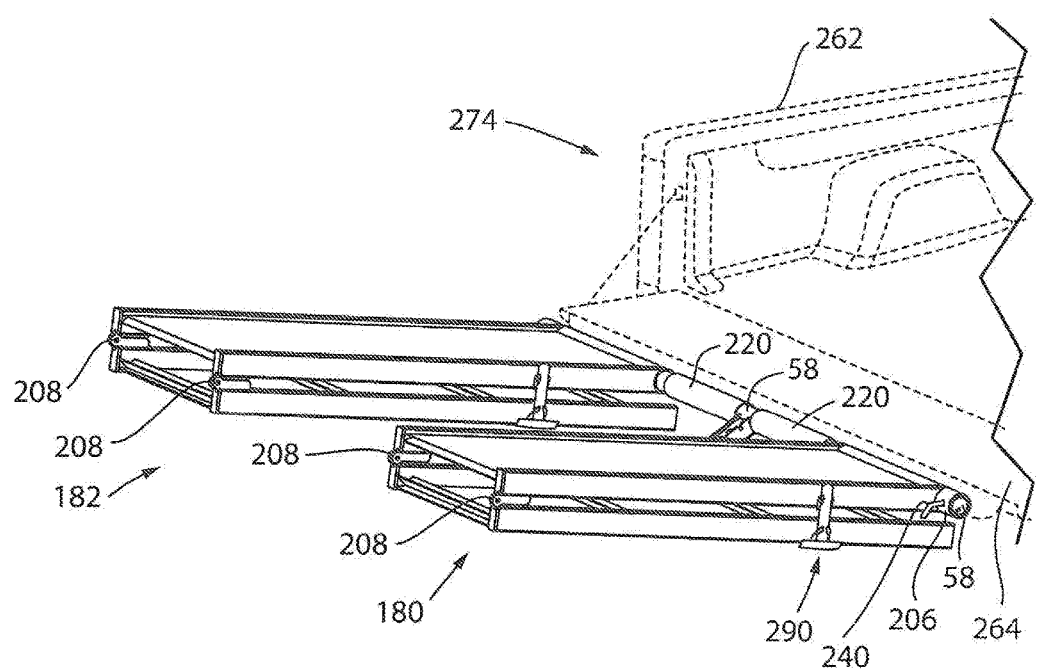
Figure 10:
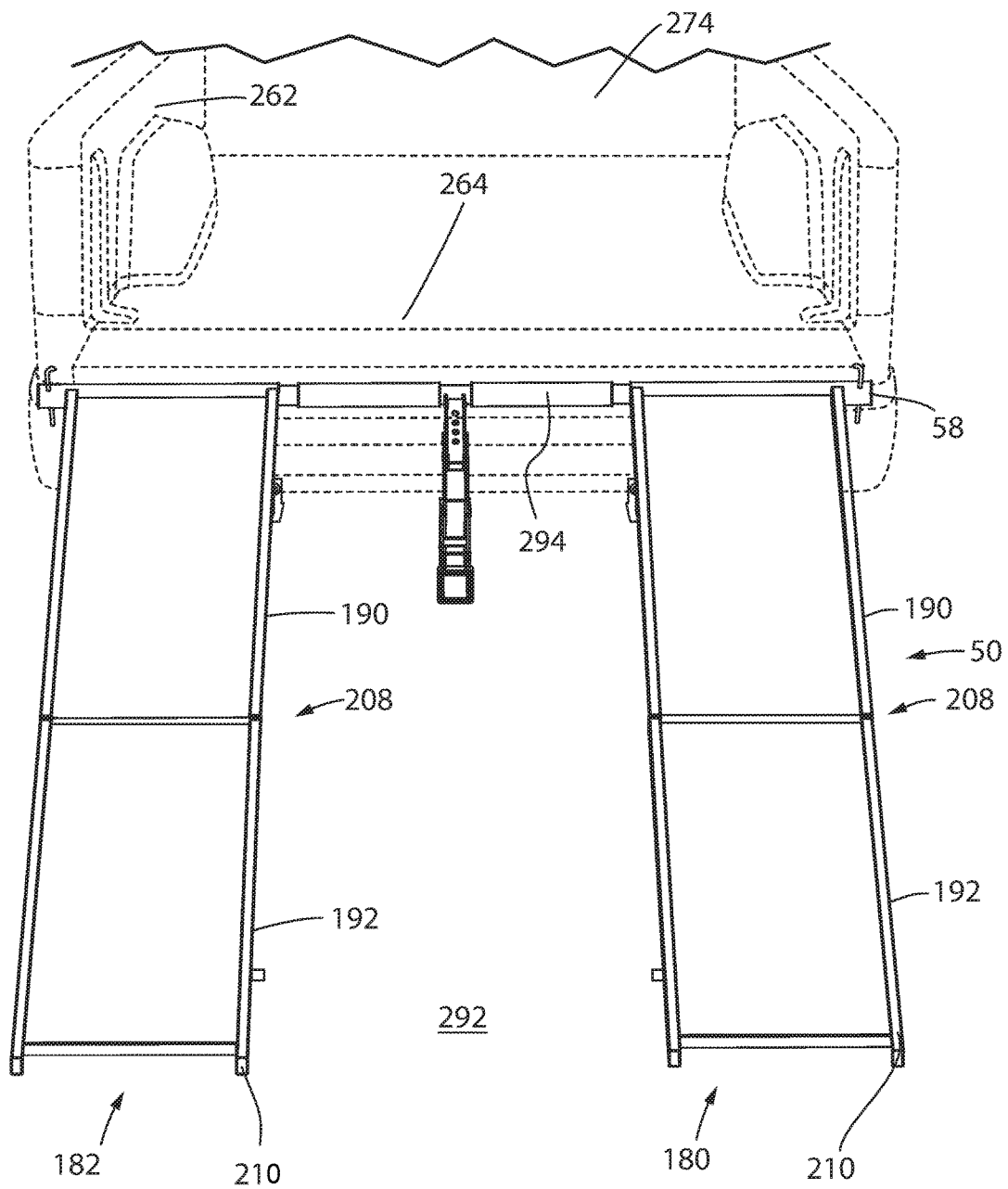
Figure 11:
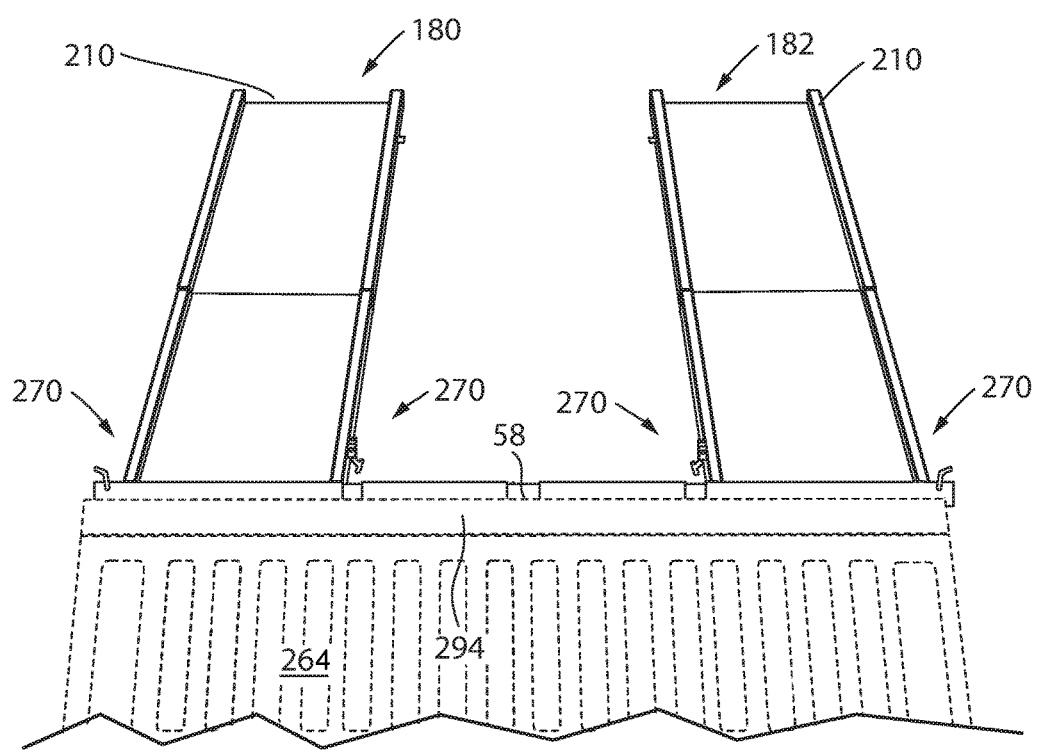
Figure 12:
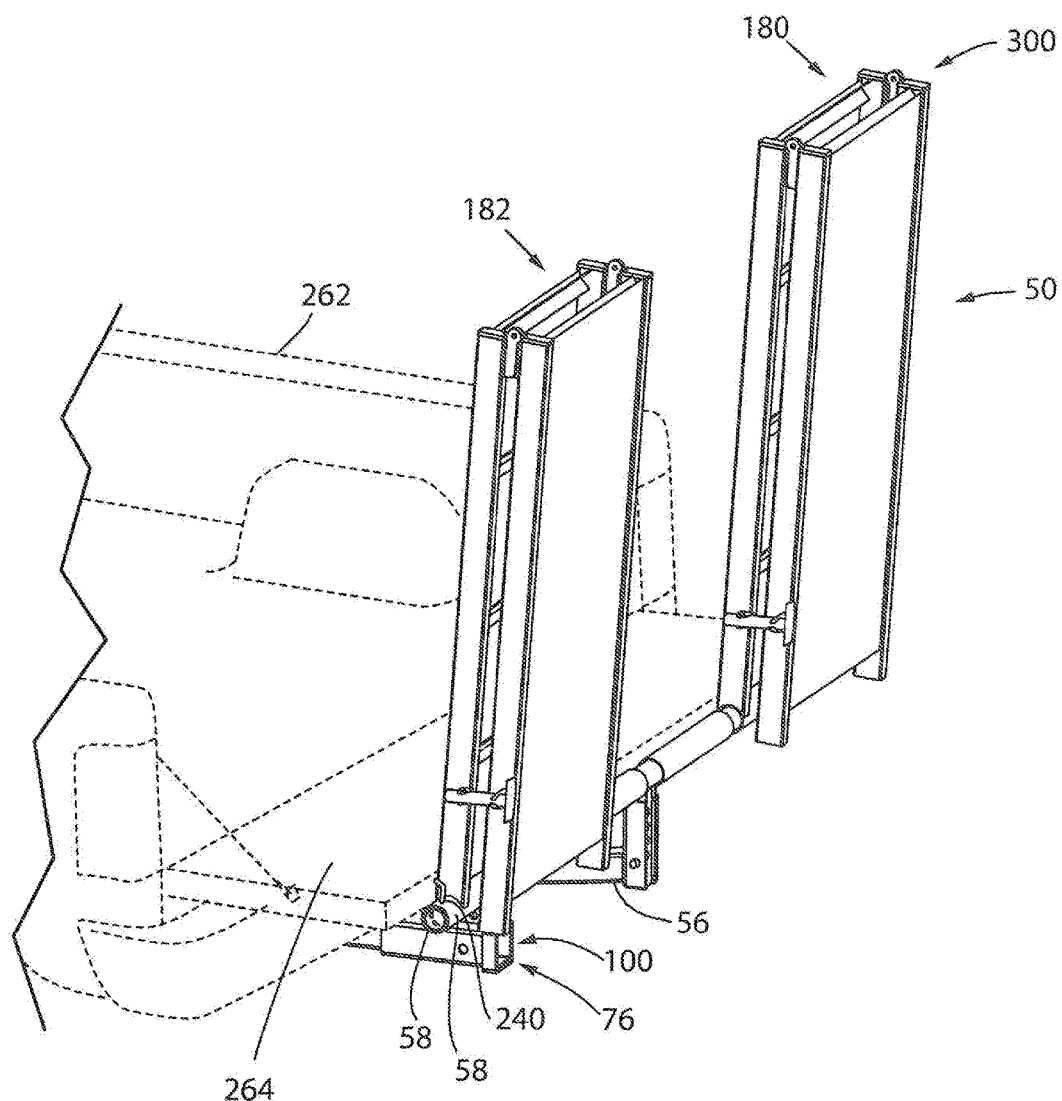

FIG. 8 a rear perspective view of the vehicle ramp system shown in FIG. 1 associated with an exemplary underlying vehicle and with the ramp sections in a transport or stowed position;

FIG. 9 is an alternate side rear perspective view of the vehicle ramp system shown in FIG. 8 with the ramp system in a partially deployed orientation relative to the underlying vehicle;

FIG. 10 is a rear perspective view of the vehicle ramp system shown in FIG. 8 in a deployed or in-use orientation relative to the underlying vehicle;

FIG. 11 is a forward oriented perspective view of the vehicle ramp system shown in the orientation shown in FIG. 10; and FIG. 12 is a view similar to FIG. 8 with the vehicle ramp system oriented in an alternate transport or stowed position relative to an exemplary underlying vehicle.

DETAILED DESCRIPTION OF THE PREFERRED EMBODIMENTS

Figure 2:
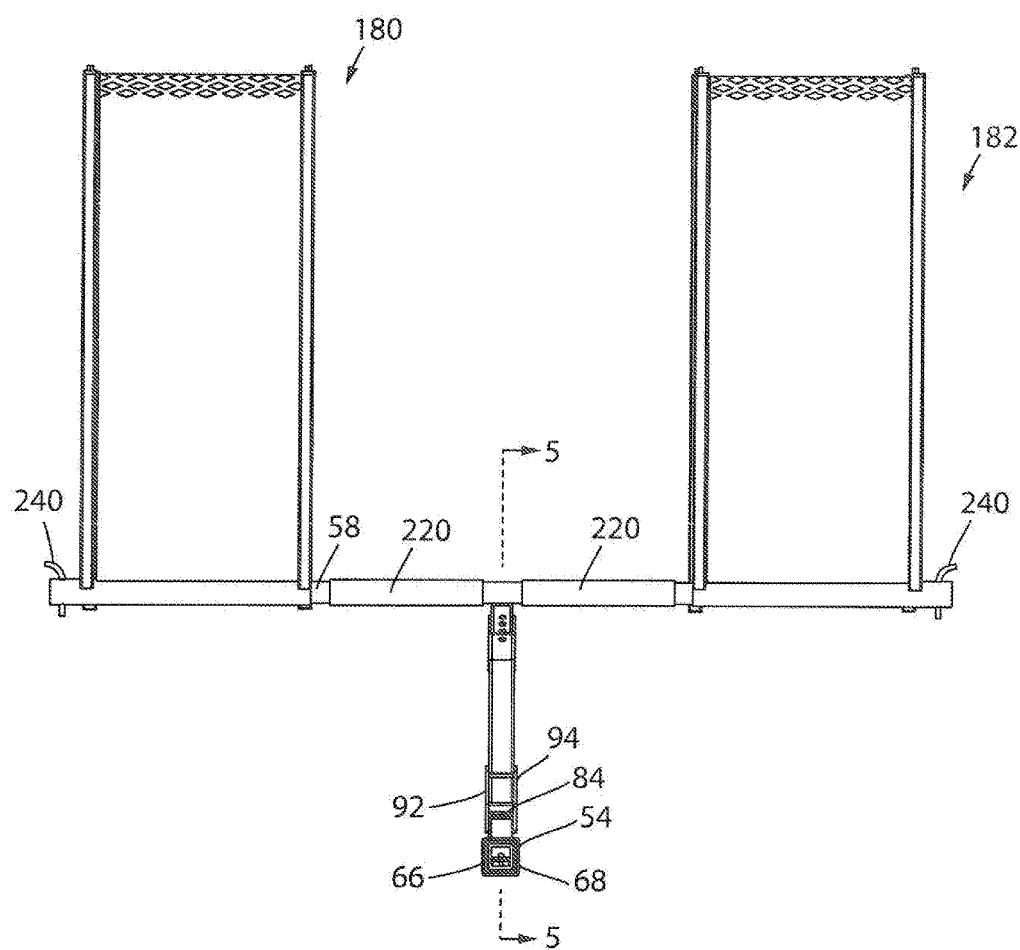
FIG. 2 is a front elevation view of the vehicle ramp system shown in FIG. 1.
Figure 3:
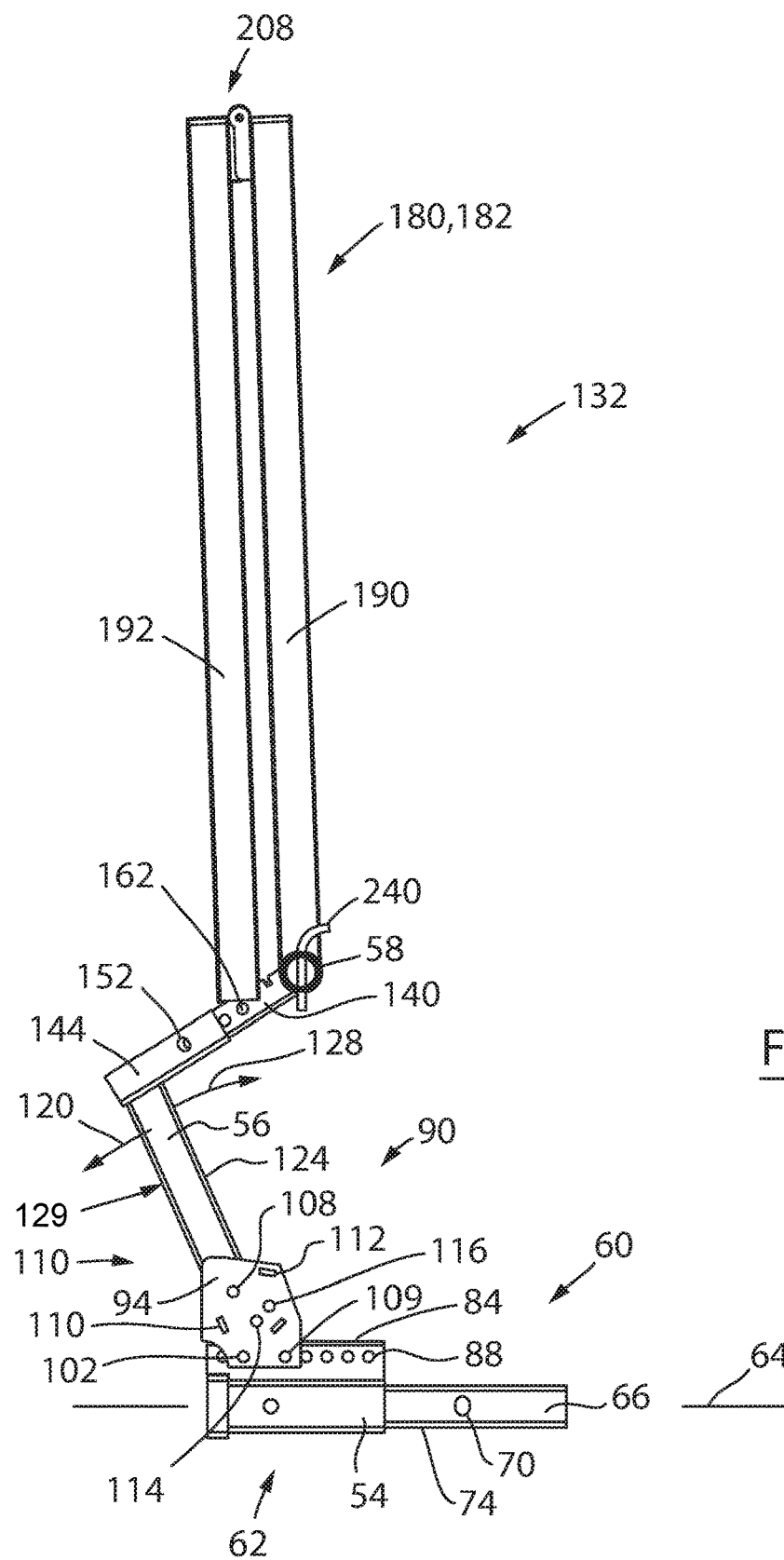
FIG. 3 is a side elevation view of the vehicle ramp system shown in FIG. 1.

FIGS. 1-3 show various views of an adjustable receiver mounted vehicle loading ramp assembly or vehicle ramp system 50 according the present invention. As described more thoroughly below with respect to FIGS. 8-12, ramp system 50 includes a mount or mounting assembly 52 that is constructed to removably but securely cooperate with a receiver commonly secured to the frame associated with the underside of a vehicle. Although FIGS. 8-12 show ramp system 50 associated with an exemplary vehicle in a form commonly referred to as a pick-up or truck vehicle, it is appreciated that ramp system 50 can be associated with various vehicle configurations wherein the underlying vehicle includes a receiver or receiver assembly more customary to over the road vehicles. Sometimes other vehicles such as ATV's, UTV's, farm, and logging equipment are equipped with such receivers at either or both of forward or rearward orientations relative to the direction of travel of the vehicle to facilitate transport of hitch or tow hook engaging accessories. Ramp system 50 is configured to removably cooperate with such vehicle mounted receivers.

Referring to FIGS. 1-3, mounting assembly 52 includes a receiver mounting body 54, a stem, stem post, or stem assembly 56 that is movably or pivotably connected to mounting body 54, and a cross member, mount tube, or cross bar 58 that is connected to stem assembly 56. Receiver mounting body 54 includes a receiver facing or forward portion 60 and a rearward facing portion 62 relative to a longitudinal axis, indicated by line 64. It should be appreciated that longitudinal axis 64 is generally aligned with a longitudinal axis associated with an underlying vehicle when ramp system 50 is secured thereto. Forward portion 60 of receiver mounting body 54 is shaped to slideably cooperate with a vehicle receiver as described further below with respect to FIGS. 8-12.

Opposite lateral facing sides 66, 68 of receiver facing or forward portion 60 each include in opening 70 that is configured to cooperate with a hitch pin associated with securing receiver mounting body 54 to a respective vehicle receiver. An exterior surface 74 of forward portion 60 is shaped to accommodate slidable cooperation with the underlying receiver and/or a sacrificial sleeve sometimes associated therewith. As commonly understood, exterior surface 74 is shaped to slideably cooperate with one of one and a quarter inch, two inch, or two and half inch generally square opening commonly associated with such a vehicle receivers, and/or the sleeves associated therewith. It is appreciated that as used herein, the phrase "standard hitch receiver" includes various categories of vehicle hitch receivers, such as Classes 1, 2, or 3, and receivers having different sizes and shapes. Such classes of receivers are commonly provided with desired or required dimensional requirements associated with cooperation of different hitch configurations and the load and tow capabilities specific to an underlying vehicle. It should be appreciated that only one such vehicle hitch receiver configuration is shown in the attached drawings.

Rearward facing or rearward portion 62 of receiver body 54 includes an opening 76 that is shaped to slideably cooperate with a hitch having a shape generally similar to exterior surface 74 associated with forward portion 60. Each opposite lateral side 78, 80 of rearward portion 62, includes an opening 82 that is configured to slideably cooperate with a hitch pin for securing supplemental hitches relative to opening 76 associated with rearward portion 62 of receiver mounting body 54. Preferably, exterior surface 74 associated with forward facing portion 60 has a similar cross-section shape as opening 76 associated with rearward portion 62 of receiver mounting body 54.

A mount structure or mounting arrangement 84 extends in longitudinal direction 64 along an upper facing surface 86 of rearward portion 62 of receiver body 54. Mounting arrangement 84 preferably includes a plurality of holes 88 that pass in a lateral direction therethrough. A pivot mount or pivot assembly 90 is securable to mounting arrangement 84 at one or more orientations relative to receiver body 54. Pivot assembly 90 includes a first plate 92 and a second plate 94 that generally flank and are adjacent to respective lateral side portions 96, 98 associated with a lower end 100 of stem assembly 56. Plates 92, 94 include respective holes 102, 104 that are each shaped to receive a respective fastener, such as a bolt and respective nut, lock nut, washer, or lock washer assembly, configured to cooperate with holes 88 defined by mounting arrangement 84 and secure plates 92, 94 relative thereto. It should be appreciated that the longitudinal orientation of holes 88 associated with mounting arrangement 84 facilitate the selective pivot assembly 90 along longitudinal direction 64 relative to receiver body 54. As disclosed further below, the selective placement of pivot assembly 90 relative to a mounting arrangement 84 defines the placement of cross bar 58 along longitudinal axis 64 and thereby the longitudinal placement of cross bar 58 relative to an underlying vehicle when ramp system 50 is secured thereto.

Each of plates 92, 94 includes a pivot hole 108 that is shaped to receive a pivot pin that secures stem assembly 56 relative to receiver body 54 such that stem assembly 56 is rotational or pivotable relative thereto. One or more stops 110, 112 extend laterally between plates 92, 94 and define a maximum relative rotation of stem assembly 56 relative to receiver body 54. Pivot assembly 90 can include one or more reinforcements 113 that extend between plates 92, 94 to improve the rigidity thereof. When configured for use with the desired vehicle, it is appreciated that the fasteners associated with holes 102, 104 associated with pivot assembly 90 relative to mounting arrangement 84, as well as the pivot pin associated with pivot hole 108, can be provided with bolt and nut arrangements that are not commonly required to be removed to effectuate manipulation of stem assembly 56 relative to an underlying vehicle. Although show as being adjustable, it is appreciated that pivot assembly 90 can be provided as a more permanent structure, such as a gusset plate or flange formed integrally with receiver body 54 or permanently affixed thereto via weldments or the like.

Plates 92, 94 of pivot assembly 90 each include an opening 114, 116 that is constructed to receive an engagement or stop pin associated with securing the relative rotational position of stem assembly 56 relative to receiver body 54. Referring to FIG. 3, a stop pin engaged with hole 116 prevents rotation of stem assembly 56 in a rearward rotational direction, indicated by arrow 120, such that lower end 100 of stem assembly 56 is snugly captured between stop 110 and that portion of the pin associated with hole 116 that extends between plates 92, 94. Removal of the pan associated with hole 116 allows rotation of stem assembly 56 in direction 120 relative to receiver body 54 until a forward facing surface 124 of stem assembly 56 engages stop 112. Engagement of the pin with hole 114 prevents rotation of stem assembly 56 about the axis associated with pivot hole 108 in an upward or forward direction, indicated by arrow 128. Said in another way, a pin associated with hole 114 defined by plates 92, 94 engages a rearward or downward facing surface 129 of stem assembly 56 when surface 124 is engaged with stop 112 thereby preventing rotation of stem assembly 56 in direction 128 relative to receiver body 54. Stops 110, 12, and the pin associated with respective openings 114, 116 associated with pivot assembly 90, allows stem assembly 56 to be positionally secured relative to receiver body 54 so as to prevent relative rotation therebetween when in the near vehicle stowed orientation 132, as shown in FIG. 3, or when the stem assembly 56 is in deployed or in-use orientation as disclosed further below with respect to FIGS. 9-12. Such a consideration allows ramp system 50 to provide a first stowed orientation wherein cross bar 58 is maintained in close proximity to a closed tailgate structure or a second stowed orientation wherein cross bar 58 is oriented in close proximity to an open tailgate structure.

Referring to FIGS. 1-6, stem assembly 56 includes a first section or portion 136 defined by a first end 138 that is pivotably connected to receiver body 54 and a second portion 140 that is constructed to be selectively secured to first portion 136. First portion 136 of stem assembly 56 includes a first section 142 and a second section 144 that is oriented at a crossing direction relative thereto. That is, second section 144 extends in a longitudinal direction 177 that is oriented in a crossing direction relative to a longitudinal axis 168 defined by first section 142. A pivot pin 109 cooperates with plates 92, 94 and first section 136 of stem assembly 56 to accommodate rotational interaction therebetween as disclosed above. Second section 144 of stem assembly 56 is preferably secured to a distal end 148 of first section 136 and constructed to adjustably cooperate therewith. Second section 144 is generally defined by a U-shaped cross-section of shape 150 and is shaped to accommodate selective securing of second portion 140 of stem assembly 56 relative to first section 136. It is appreciated that second section 144 could be provided in other cross sectional shapes, such as a tubular shape, configured to facilitate the slideable selective cooperation between first portion 136 and second portion 140 of stem assembly 56.

An opening 152, 154 is formed in one or more of the opposite lateral walls 156, 158 or a bottom facing wall 160 of second section 144 of first portion 136 of stem assembly 56. Second portion 140 of stem assembly 56 includes one or more openings 162, 164 that are formed in opposing lateral or opposing oriented walls associated with second portion 140. Respective openings 162, 164 associated with second portion 140 are oriented to be aligned with a respective opening or opening pair 152, 154, 162, 164 associated with second section 144 of first portion 136 of stem assembly 56, so as to cooperate with a fastener, such as a bolt and nut or similar such fastener arrangement, to selectively secure the relative orientation of a distal end 166 associated with second section 144 relative to longitudinal axis indicated by line 168 associated with first portion 136 of stem assembly 56. It is further appreciated that stem assembly 56 could be provided as a singular structure but such a configuration would require the providing of discrete number of stem assemblies to accommodate use of ramp system 50 with vehicles having different shapes and/or configurations. It should be further appreciated that once configured for use with an intended vehicle, it is envisioned that mounting arrangement 84 associated with pivot assembly 90 and the adjustable connections associated with stem assembly 56 need not be adjusted unless ramp system 50 is intended to be associated with a vehicle having a different underlying construction.

Cross bar 58 is secured to distal end 166 of second portion 144 of stem assembly 56 such that the association of a fastener with second section 144 of first portion 136 and relative or respective openings 162, 164 associated with second portion 140 of stem assembly 56 provides adjustability of the lateral and vertical orientation of cross bar 58 relative to an underlying vehicle and relative to axis 64 associated with receiver body 54. Such adjustability allows ramp system 50 to be independently configured to accommodate use of ramp system 50 with a respective vehicle when receiver body 54 is engaged with a receiver secured thereto in a manner that preferable does not allow contact between the ramp system and the structures of the underlying vehicle aside from the receiver. Said in another way, such adjustability allows ramp system 50 to be uniquely configured to accommodate the underlying construction, and/or configuration, and/or body styles associated with a plurality of vehicles. Preferably, cross bar 58 is adjustably but permanently affixed to stem assembly 56 such that the engagement between second portion 140 of stem assembly 56 and cross bar 58 is oriented generally vertically above receiver body 54.

Referring to FIGS. 1, 2, 6, and 7, each respective ramp assemblies 180, 182 of ramp system 50 slideably and rotationally cooperates with a respective outboard lateral portions 184, 186 of cross bar 58 relative to axis 170 associated with second portion 140 of stem assembly 56. Each ramp assembly 180, 182 includes a first ramp section 190 and a second ramp section 192 that are pivotably connected to one another and are independently rotatable, and positionable, relative to cross bar 58.

Each ramp section 190, 192 is generally defined by a pair of opposing longitudinal rails 194, 196 and one or more optional lateral frame members 198 that extend therebetween. Ramp surface 200 is defined by each ramp section 190, 192 between the respective longitudinal rails 194, 196. Preferably, ramp surfaces 200 are formed of an expanded metal material, although other materials, such as carbon fiber materials, are envisioned as providing a suitable support surface associated with use of ramp surfaces 200 to support personal or equipment intended to be associated with or removed from the cargo area of an underlying vehicle.

Each first ramp section 190 includes a first end 204 that is generally defined by a mount tube 206. Each mount tube 206 is shaped to slideably cooperate with cross bar 58 and preferably extends at least the entire lateral width associated with the respective ramp section. One or more pivots or hinges 208 are associated with a second longitudinal end portion 210 of each first ramp section 190 and secured to a respective second ramp section 192 thereby providing a pivotable or rotational connection therebetween such that the respective first and second ramp section pairs can be oriented in a folded stowed configuration or a deployed orientation wherein the respective ramp sections are aligned with one another in a longitudinal direction to form an elongated ramp arrangement.

Each second ramp section 192 is defined by a distal end 210 and a first ramp section facing end 212. First ramp section facing end 212 of each of ramp sections 192 are secured to a respective hinge 208 such that each second ramp section 192 is pivotably or rotationally connected to a respective first ramp section 190. As disclosed further below, second ramp sections 192 are pivotably secured to a respective first ramp section 190 such that each second ramp section 192 is independently rotational in an outward and rearward rotational direction relative to the respective first ramp section 190 associated with cross bar 58 when the discrete ramp assemblies are deployed.

Ramp system 50 includes one or more spacers or collars 220 that are also shaped to slideably cooperate with cross bar 58. Spacers 220 are constructed to limit lateral translation of respective ramp assemblies 180, 182 relative to the longitudinal axis, indicated by line 222 associated with cross bar 58. As disclosed further below, ramp sections 190 and collars 220 cooperate with cross bar 58 in a manner that allows ramp assemblies 180, 182 and collars 220 to cooperate with cross bar 58 in various configurations that manipulate the spacing or wheel base associated with use of ramp system 50. Preferably, when folded, ramp sections 190, 192 generally overlie one another in close proximity relative thereto. Such considerations further facilitate compact storage associated with ramp system 50 during nonuse thereof, as well as during transport of the discrete ramp assemblies 180, 182.

As shown in FIGS. 2, 3, 6, and 7, each mount tube 206 associated with the first ramp section 190 preferably extends the entire lateral distance between longitudinal members 194, 196 associated with the respective first ramp section 190. Preferably, each mount tube 206 also includes an end portion 224 that extends in a lateral direction beyond at least one of the respective longitudinal member 194, 196 associated with the respective ramp assembly 180, 182. At least one pair of holes 226 extend across a cross-section associated with the respective end portion 224. Cross bar 58 preferably includes a respective laterally inboard hole set 230 and a laterally outboard hole set 232 wherein each hole set preferably includes a pair or aligned openings 236, 238 that extend through cross bar 58 and are oriented to be aligned with openings 226 associated with a respective mount tube 206 when the respective ramp assembly 180, 182 is engaged therewith. It should be appreciated that the respective opposite lateral side portions 184, 186 of cross bar 58, relative to axis 170, have generally mirror image constructions of one another. Openings 236, 238 associated with cross bar 58 and openings 226 associated with mount tube 206 are each constructed to cooperate with a lock pin 240 (FIG. 2), so as to secure the respective ramp assembly 180, 182 relative to a respective outboard lateral portion 184, 186 of cross bar 58.

Figure 6:
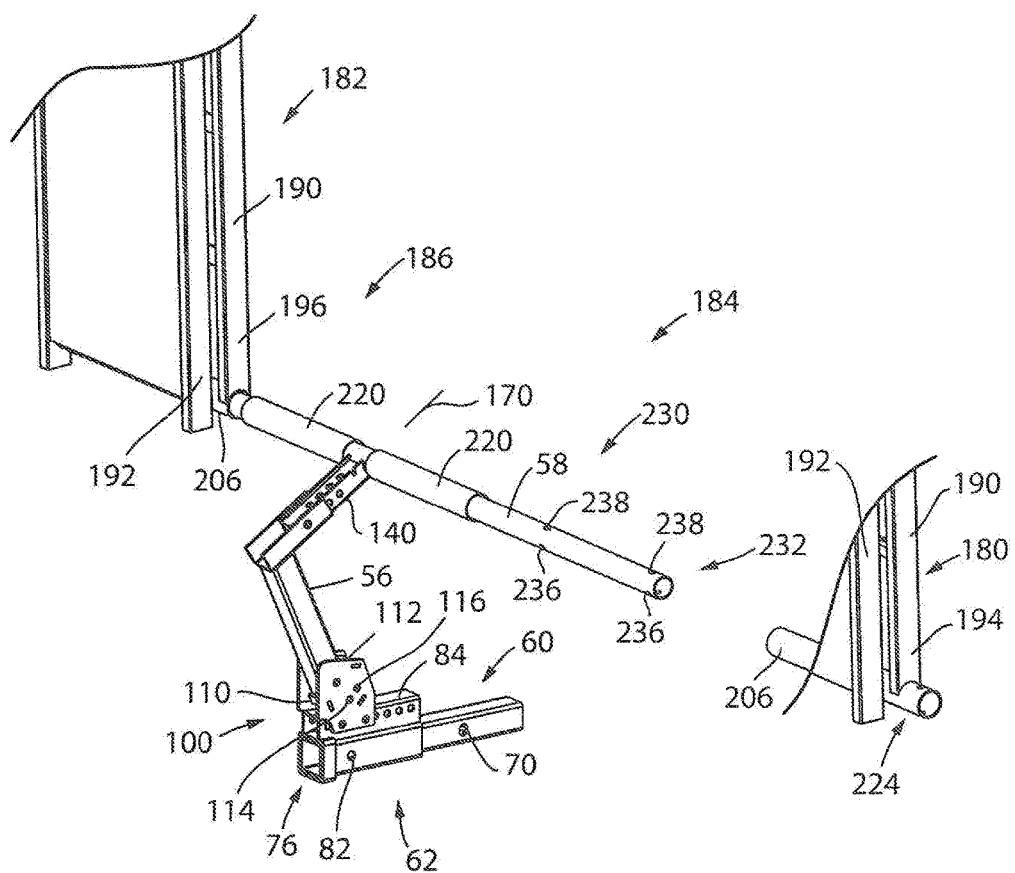
FIG. 6 is a view similar to FIG. 1 with one ramp assembly exploded therefrom.
Figure 7:
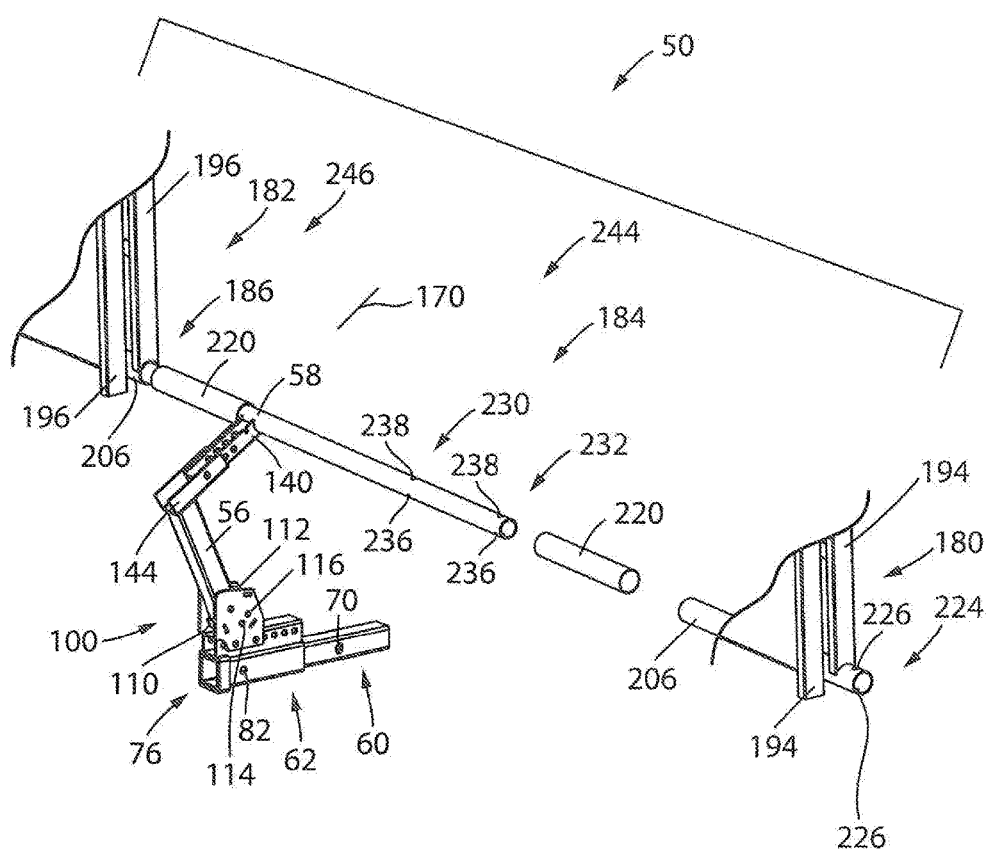
FIG. 7 is a view similar to FIG. 6 and shows the vehicle ramp assembly with a ramp and a collar exploded therefrom.

Referring to FIGS. 6 and 7, it should be appreciated that when pin 240 is engaged with openings 226 of mount tube 206 and openings 238 associated with cross bar 58, the respective first section 190 associated with the respective ramp assembly 180, 182 is oriented in a generally vertical orientation relative to cross bar 58. It should be further appreciated that when pin 240 is engaged with respective opening set 230 and a mount tube 206, the respective ramp assembly 180, 182 is oriented laterally nearer stem assembly 56 than when pin 240 is engaged with opening set 232 and holes 226 associated with mount tube 206. When pin 240 is removed from a respective mounting tube 206 and the underlying cross bar 58, mount tube 206 is rotatable and laterally translatable relative to cross bar 58. Association of a respective pin with the more horizontally oriented openings 236 associated with hole sets 230, 232 allows respective ramp assemblies 180, 182 to be secured relative to cross bar 58 in respective laterally inboard or laterally outboard orientations such that the respective ramp assembly 180, 182 in a vertical orientation when stem assembly 56 is oriented in either of the forward rotational orientation or the rearward rotational position relative to receiver body 54.

As disclosed further below with respect to FIGS. 8-12. It should be further appreciated that respective ramp assemblies 180, 182 are each constructed to cooperate with both of the respective outboard lateral portions 244, 246 of cross bar 58 such that ramp system 50 can be configured to provide various widths and/or gaps between the discrete ramp assemblies 180, 182 when the ramp assemblies 180, 182 are secured to cross bar 58. Similarly, spacers 220 are constructed to be oriented laterally inboard or laterally outboard relative to a respective ramp assembly 180, 182 associated with a respective lateral portion 244, 246 associated with cross bar 58. Alternatively, it is envisioned that each of ramp assemblies 180, 182 can be oriented adjacent stem assembly 56, or associated with a single outboard lateral portion 244, 246 associated with cross bar 58. Such considerations allow ramp system 50 to accommodate use and storage of the same for loading and/or unloading of equipment and/or accessories having various wheelbase dimensions. When one or more of ramp assemblies 180, 182 are deployed to extend rearward relative to the support vehicle, engagement of pin 240 with a respective hole set 230, 232 of cross bar 58, whether or not pin engaged mount tube 206, prevents outboard lateral translation of the respective ramp assembly 180, 182 thereby preventing separation of the respective ramp assemblies 180, 182 from cross bar 58 of ramp system 50 during loading and unloading activities.

Figure 5:
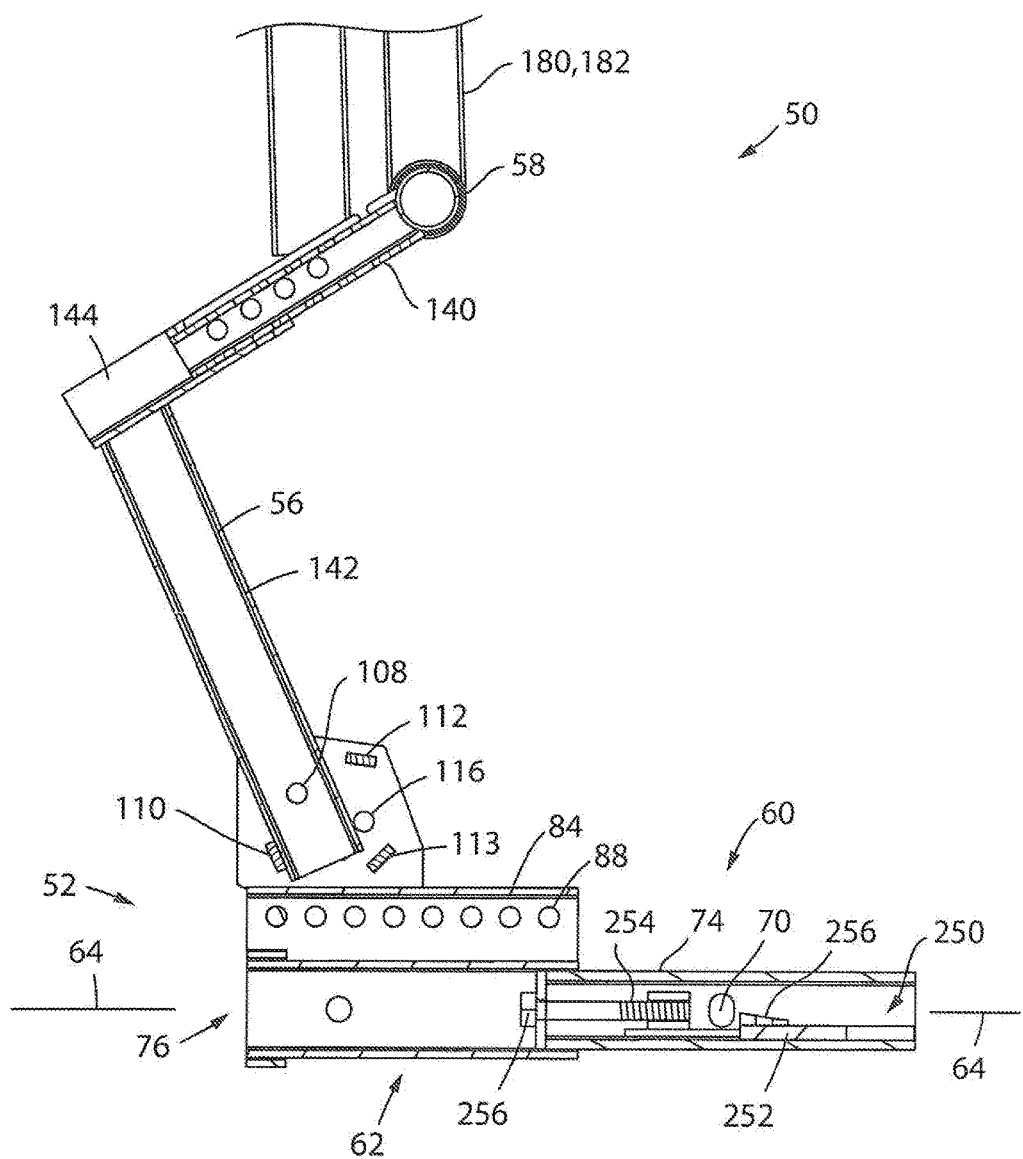
FIG. 5 is a cross sectional view of the vehicle ramp system taken along a line 5-5 shown in FIG. 2.

Referring to FIG. 5, another aspect of the present invention relates to enhancing the security or the rigidity with which ramp system 50 can be secured to an underlying vehicle. As shown in FIG. 5, a wedge assembly 250 is disposed in receiver body 54 and includes a wedge 252 that cooperates with a drive element 254. Operation of drive element 254 effectuates translation of wedge 252 in longitudinal direction 64 relative to hitch pin opening 70 defined by forward portion 60 of mount assembly 52. Drive element 254 includes a head portion 256 that can be engaged by a driven member, such as a socket or the like, via opening 76 associated with rearward portion 62 of mount assembly 52. Longitudinal translation of wedge 252 relative to forward portion 60, translates a surface 258 of wedge 252 into engagement with the hitch pin engaged with opening 70 and the vehicle receiver associated therewith thereby securing mount assembly 52 relative to a receiver of the underlying vehicle. Compression of surface 256 into engagement with the respective hitch pin prevents manual removal of mount assembly 52 from the underlying vehicle prior to loosening of wedge assembly 250. The biasing of forward portion 60 of mount assembly 52 into engagement with the internal cavity and/or the surface associated with the vehicle receiver, also provides a more robust or planar engagement interface or interaction between mount assembly 52 and the cavity defined by the receiver of the underlying vehicle. Such considerations mitigate translation or wobble of ramp system 50 relative to the underlying vehicle when ramp system 50 is engaged with the vehicle receiver and wedge assembly 250 is biased into engagement with the hitch pin associated with opening 70. Further, the hidden from open view nature associated with the construction and operation of wedge assembly 250 mitigates concerns associated with removal of ramp system 50 from a vehicle by third parties unfamiliar with the existence or operation of wedge assembly 250. The tool operable nature associated with wedge assembly 250 further alleviates concerns associated with undesired third party removal of ramp system 50 from an underlying vehicle when wedge assembly 250 is engaged with the receiver hitch pin.

Although wedge assembly 250 is shown as including a single wedge 252, it is further appreciated that wedge assembly 250 can include multiple wedges. Such a consideration is beneficial for those vehicle receiver constructions that include more than one hitch pin opening wherein the discrete hitch pin openings are provided in a spaced orientation along the longitudinal axis of the underlying vehicle receiver. Preferably, regardless of the specific configuration of wedge assembly 250, no portion of the wedge assembly extends beyond the forward oriented face of the vehicle receiver. Such a consideration mitigates concerns associated with obstruction to the operation of wedge assembly 250. It is further appreciated that although wedge 252 includes a forward oriented inclined surface, wedge assembly 250 could be provided with a rearward facing inclined surface such that rearward directed translation of the wedge 252 relative to mounting body 52 effectuates the desired securing interaction between wedge 252 and the associated receiver hitch pin.

FIGS. 8-12 show ramp system 50 engaged with a receiver 260 associated with an exemplary vehicle 262 and in various orientations relative thereto. Referring to FIG. 8, ramp assemblies 180, 182 are oriented in a generally vertical orientation and in close proximity to a closed tailgate 264 associated with vehicle 262. From the foregoing description, it should be appreciated that introduction of a hitch pin 266 with vehicle receiver 260 passes through openings 70 (FIG. 3) associated with mounting assembly 52 thereby securing ramp system 50 relative to vehicle 262. Although secured for use and transport via hitch pin 266, operation of wedge assembly 250 (FIG. 5) provides a more robust and non-manually removable secured connection of ramp system 50 relative to vehicle 262.

A pivot pin 268 is engaged with opening 116 associated with pivot assembly 90 thereby maintaining the generally vertical orientation of stem assembly 56 relative to vehicle 262. It is appreciated that pivot pin 268 can be provided in various configurations such as a pin with a handle section and a clasp pin hole or groove or other removable pins having selectively operable retention structures configured to prevent unintentional dissociation of the pivot pin 268 from pivot assembly 90. Cross bar 58 is maintained in generally close proximity to the rear of vehicle 262 and pins 240 associated with mount tubes 206 and cross bar 58 maintain the generally vertical orientation of ramp assemblies 180, 182 relative to the underlying vehicle 262. Preferably, one or more manually operable retention or clasp assemblies 270 extend between respective ramp sections 190, 192 to maintain ramp assemblies 180, 182 in the generally closed or longitudinally overlapping or non-use orientation shown in FIGS. 8, 9, and 12. It is appreciated that clasp assemblies 270 can be provided in any number of configurations, such as overlapping eyelets configured to cooperate with a manually removable pin or the like, and/or magnetic closure assemblies associated with selectively retaining the respective ramp sections 190, 192 in the closed or stowed orientation as shown in FIGS. 8, 9, and 12.

Figure 4:
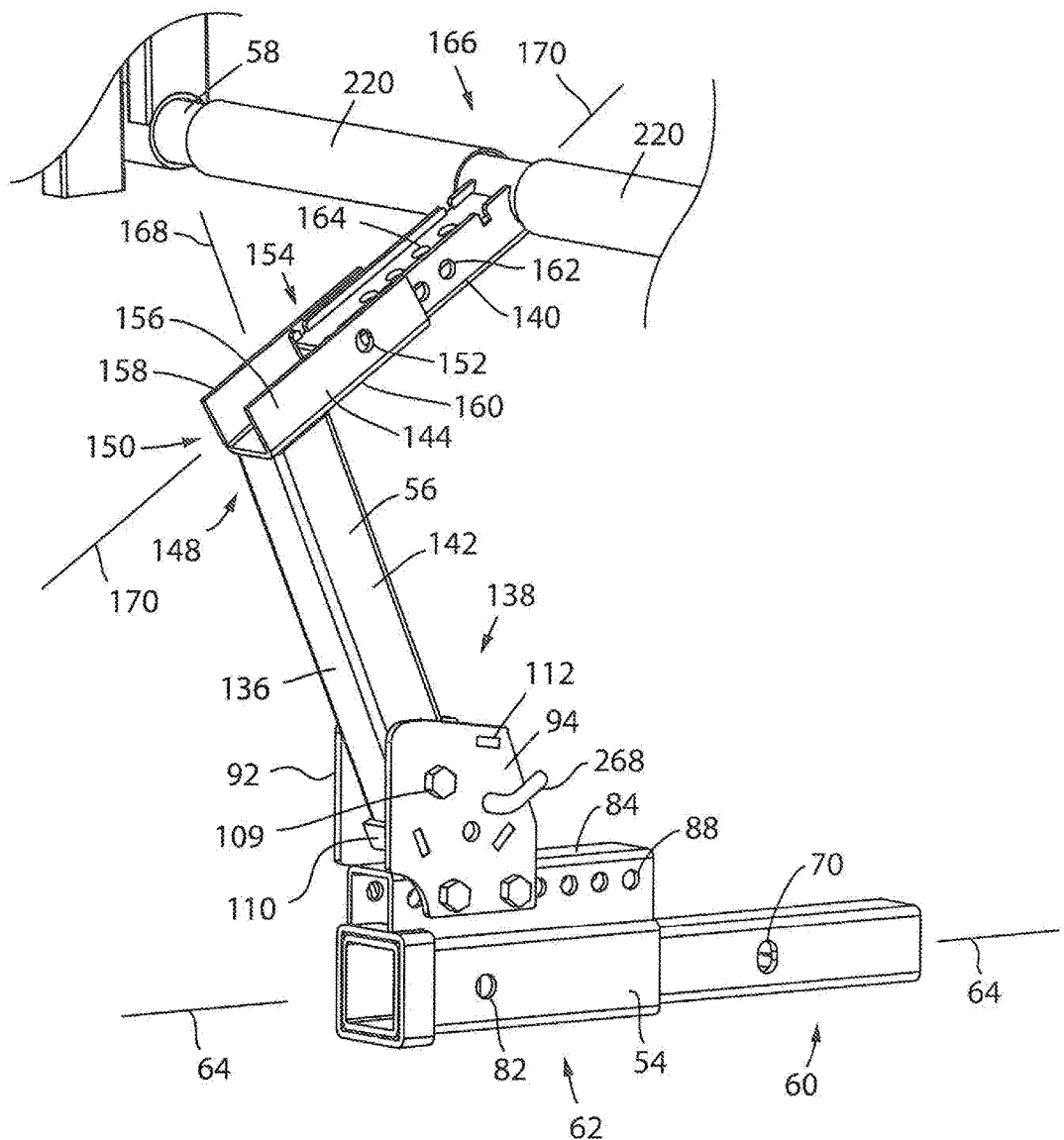
FIG. 4 is a rear perspective view of a mounting assembly of the vehicle ramp system shown in FIG. 1.

Referring to FIGS. 4 and 9, when access to a cargo area 274 associated with vehicle 262 is desired, removal of pin 268 (FIG. 4) associated with pivot assembly 90, allows stem assembly 56 to rotate in a generally rearward and downward direction relative to tailgate 264 of vehicle 262. As shown in FIG. 9, closure or clasp assemblies 290 maintain the folded orientation of respective ramp assemblies 180, 182 and the engagement of pins 240 between respective mount tubes 206 and cross bar 58 prevent rotation of ramp assemblies 180, 182 relative to vehicle 262 aside from the rotation of stem assembly 56. As shown in FIG. 9, when rotated to the generally rearward orientation such that stem assembly 56 is brought into abutment with stop 112 (FIG. 5), tailgate 264 is openable without impinging upon ramp system 50 and so as to allow generally unencumbered access to cargo area 274 defined by vehicle 262 even though ramp assemblies 180, 182 remain non-deployed.

Referring to FIGS. 9 and 10, when use of one or more of discrete ramp assemblies 180, 182 is desired, removal of pin 240 and operation of respective clasp assemblies 290 allows discrete ramp assemblies 180, 182 to be rotated in a generally forward direction relative to vehicle 262, and the unfolded such that ramp sections 190, 192 can achieve a generally linear orientation and distal end 210 of one or both of ramp sections 192 can be placed upon a support surface, such as the ground 292. Referring to FIG. 10, when deployed, ramp assemblies 180, 182 are oriented in a generally longitudinal direction to extend rearward and downward relative to a terminal edge 294 of tailgate 264. Cross bar 58 is maintained in generally close proximity to terminal edge 294 of tailgate 264 when rotated to the rearward rotational position so as to provide a generally smooth transition from ramp assemblies 180, 182 into cargo area 274 associated with vehicle 262. When in the unfolded orientation, the ends of longitudinal members 194, 196 associated with ramp sections 190, 192 proximate hinges 208 generally abut one another so as to provide a generally robust pivotable connection between the discrete ramp sections 192, 190 associated with the respective ramp assemblies 180, 182. Such considerations further mitigates concerns associated with overloading of the operation of the hinge assemblies 208 associated with a discrete ramp assembly.

Referring to FIGS. 10 and 11, it should be appreciated that the orientation of ramp assemblies 180, 182 relative to cross bar 58 are oriented in their widest lateral positions relative to vehicle 262. Switching of the respective lateral sides of ramp assemblies 180, 182, and/or the relative lateral position of the discrete ramp assemblies 180, 182 relative to cross bar 58, and/or manipulation of the relative position of spacers 220 associated therewith thereby allowing ramp assemblies 180, 182 to be associated with cross bar 58 in a manner wherein the discrete ramp assemblies 180, 182 can be secured to cross bar 58 in various widths relative to vehicle 262. Such a consideration allows ramp system 50 to be uniquely configured for various loading and unloading operations.

Referring to FIG. 12, if it is desired or required that tailgate 264 be maintained in the generally open configuration during use of vehicle 262, ramp assemblies 180, 182 can be returned to the folded orientation and rotated relative to cross bar 58 such that pin 240 can be engaged with the respective mount tube 206 and relative set of openings 236 (FIG. 7) associated with mount tube 58 such that ramp assemblies 180, 182 can be oriented in a generally vertical orientation relative to vehicle 262 even one tailgate 264 is required to be maintained in a generally open configuration relative to vehicle 262. Said in another way, ramp system 50 provides a first stowed orientation 132 as shown in FIG. 8 and a second stowed orientation 300 and shown in FIG. 12 wherein ramp system 50 does not interfere with use of vehicle 262 during over the road transport operations.

As disclosed above, ramp system 50 is configured to accommodate loading and unloading of vehicles, equipment, accessories, and implements having configurations and/or different wheel bases into a cargo area of a transport vehicle that is configured to support the loading ramp system. Reversing the association of ramp assemblies 180, 182 with the discrete lateral side portions of cross bar 58 allows ramp system 50 to be configured be positioned laterally inboard or laterally outboard to provide four different centrally oriented ramp configurations. It should be further appreciated that additional orientations can be achieved wherein ramp assemblies are non-symmetrically oriented relative to cross bar 58.

Although many of the descriptions of the assembly shown in the figures indicate that metals such as steel and aluminum are preferred building material, other materials can be used for any of the above described components. Additionally, it is further appreciated that the ramp system disclosed above can feature components varying in size, for instance depending on the desired ramp configuration or the size of the vehicle. As such, any specific dimensions provided above are illustrative of one configuration but should not be read as limiting.

It should also be noted that many of the components used with the ramp system disclosed above include holes, openings, recesses, and the like through which securement devices are used. Although the above-disclosure refers primarily to fasteners or "pins", it is appreciated that the ramp system need not operate merely with pins. Other securement devices, for instance clips, bolts, threaded and unthreaded fasteners, etc., that may be attachably removed and/or secured can be used to secure the components together, such that the ramp system can be easily adjusted to accommodate a respective users desired configuration of the ramp system and/or for manipulating the configuration of the ramp system to accommodate various vehicle configurations.

Therefore, one embodiment of the invention includes a vehicle ramp system that removably cooperates with a vehicle mounted hitch receiver and having a mounting assembly that is constructed to removably cooperate with the vehicle hitch receiver. The ramp system includes a first ramp and a second ramp that are supported by the mounting assembly such that the first ramp and the second ramp are pivotably attached to the mounting assembly. A supplemental vehicle hitch receiver is defined by the mounting assembly and is configured to receive a hitch such that the mounting assembly is disposed between the vehicle hitch receiver and the hitch.

A further embodiment of the invention includes a vehicle loading ramp system having a mounting assembly that can be releasably connected to a receiver secured to a vehicle. A support post assembly includes a first end portion that is pivotally connected to the mounting assembly such that the support post assembly can pivot between a stowed position wherein the support post assembly is oriented nearer a rear portion of a vehicle and a deployed position wherein the support post assembly is rotated away from the rear portion of vehicle. A cross member is attached to a second end portion of support post assembly that is generally opposite the first end portion of the support post. A first ramp section and a second ramp section are each connected to the cross member such that the first ramp section and the second ramp section are independently rotatable relative to the cross member.

Another embodiment of the invention includes a vehicle receiver supported ramp system having a mounting assembly that is constructed to removably cooperate with a vehicle hitch receiver. A support post is pivotally connected to the mounting assembly and a cross bar is connected to the support post at a location that is offset from the mounting assembly such that a first portion of the cross bar and a second portion of the cross bar are oriented on generally opposite lateral sides of the support post. A first ramp section and a second ramp section are each constructed to slideably and pivotably cooperate with each of the first portion and the second portion of the cross bar such that the first ramp section and the second ramp section can each be selectively engaged with one of the first portion and the second portion of the cross bar to define a plurality of wheel base dimensions defined by a distance between the first ramp section and the second ramp section when the ramp sections are engaged with the cross bar.

It should also be noted that many of the components used with the ramp system disclosed above include holes, openings, recesses, and the like through which securement devices are used. Although the above-disclosure refers primarily to fasteners or "pins", it is appreciated that the ramp system need not operate merely with pins. Other securement devices, for instance clips, bolts, threaded and unthreaded fasteners, etc., that may be attachably removed and/or secured can be used to secure the components together, such that the ramp system can be easily adjusted to accommodate a respective users desired configuration of the ramp system and/or for manipulating the configuration of the ramp system to accommodate various vehicle configurations.

The present invention has been described in terms of the preferred embodiment, the embodiment disclosed herein is directed to the assembly as generally shown in the drawings. It is recognized that equivalents, alternatives, and modifications, aside from those expressly stated, to the embodiments summarized, or the embodiment shown in the drawings, are possible and within the scope of the appending claims. The appending claims cover all such alternatives and equivalents.

We claim:

1. A vehicle ramp system that removably cooperates with a vehicle mounted hitch receiver, the vehicle ramp system comprising:
   a mounting assembly constructed to removably cooperate with a vehicle hitch receiver;
   a first ramp and a second ramp supported by the mounting assembly, the first ramp and the second ramp being pivotably attached to the mounting assembly;
   a supplemental vehicle hitch receiver defined by the mounting assembly and configured to receive a hitch such that the mounting assembly is disposed between the vehicle hitch receiver and the hitch;
   a cross member securing to the mounting assembly and oriented such that the first and second ramps each rotationally cooperate with the cross member; and the mounting assembly including a stem portion that is pivotably connected to the mounting assembly and which supports the cross member, while the cross member supports the first and second ramps, while pivoting between a stowed position wherein the stem portion is oriented nearer a rear portion of a vehicle and a deployed position wherein the stem portion is rotated away from the rear portion of the vehicle, wherein the first and second ramps each include a first ramp portion and a second ramp portion that are pivotably connected to one another such that an axis of rotation between the first ramp portion and the second ramp portion is oriented generally vertically above an axis of rotation between the first and second ramps and the cross member when in the stowed position, wherein the first ramp portion of each of the first and second ramps includes a first end defined by a mount tube that is pivotably connected to the cross member so as to provide a smooth transition from the first ramp portion to the rear portion of a vehicle with the mount tube in between when in the deployed position and a second end distal to the first end in a longitudinal direction of the first ramp portion that is pivotably connected to the second ramp portion, wherein the mount tube of the first ramp portion of each of the first and second ramps is configured to slideably cooperate with the cross member, and wherein the mounting assembly further comprises a plurality of stops that extend laterally between plates of the mounting assembly and define a maximum relative rotation of the stem portion.

2. The vehicle ramp system of claim 1 wherein the mounting assembly includes a receiver portion that is constructed to engage the vehicle hitch receiver, wherein the stem portion is disposed between the receiver portion and the cross member and is pivotably connected to the receiver portion of the mounting assembly.

3. The vehicle ramp system of claim 2 wherein the stem portion is securable to the receiver portion in more than one position and securable to the cross member in more than one position.

4. The vehicle ramp system of claim 1 further comprising a wedge assembly that moveably cooperates with the mounting assembly and is adjustable to selectively prevent removal of a hitch pin that passes through the mounting assembly and the vehicle hitch receiver.

5. The vehicle ramp system of claim 4 wherein the wedge assembly further comprises a shaft having a drive element associated with a rearward facing end portion of the shaft and a wedge associated with a forward facing end portion of the shaft such that rotation of the drive element manipulates a distance between the wedge and the hitch pin in a longitudinal direction aligned with a longitudinal axis of the shaft.

6. The vehicle ramp system of claim 5 wherein the drive element is accessible via a passage defined by the supplemental vehicle hitch receiver.

7. A vehicle loading ramp system comprising:
a mounting assembly releasably connected to a receiver secured to a vehicle;
a support post assembly having a first end portion that is pivotably connected to the mounting assembly such that the support post assembly can pivot between a stowed position wherein the support post assembly is oriented nearer a rear portion of a vehicle and a deployed position wherein the support post assembly is rotated away from the rear portion of vehicle;
a cross member attached to a second end portion of support post assembly that is generally opposite the first end portion; and
a first ramp section and a second ramp section that are each connected to the cross member such that the first ramp section and the second ramp section are independently rotatable relative to the cross member, wherein the support post assembly supports the cross member, while the cross member supports the first and second ramp sections, while pivoting between the stowed and deployed positions, wherein the first and second ramp sections each include a forward ramp portion and a rearward ramp portion, relative to a longitudinal axis of a vehicle, that are pivotably connected to one another such that an axis of rotation between the forward ramp portion and the rearward ramp portion is oriented generally vertically above an axis of rotation between the first and second ramp sections and the cross member when in the stowed position, wherein the forward ramp portion of each of the first and second ramp sections includes a first end defined by a mount tube that is pivotably connected to the cross member so as to provide a smooth transition from the forward ramp portion to the rear portion of a vehicle with the mount tube in between when in the deployed position and a second end distal to the first end in a longitudinal direction of the forward ramp portion that is pivotably connected to the rearward ramp portion, wherein the mount tube of the forward ramp portion of each of the first and second ramp sections is configured to slideably cooperate with the cross member, and wherein the mounting assembly further comprises a plurality of stops that extend laterally between plates of the mounting assembly and define a maximum relative rotation of the support post assembly.

8. The vehicle loading ramp system of claim 7 wherein the second end portion of the support post assembly engages a center portion of the cross member and each of the first ramp section and the second ramp section can be associated with either of opposite longitudinal ends of the cross member.

9. The vehicle loading ramp system of claim 7 wherein at least one of the first ramp section and the second ramp section can be secured relative to the cross member at a plurality of rotational positions and a plurality of lateral positions relative to a width of a vehicle.

10. The vehicle loading ramp system of claim 7 wherein the mounting assembly further comprises an adjustment assembly that is securable to the mounting assembly in a plurality of positions to manipulate a distance between the first end portion of the support post assembly and a rear portion of the vehicle.

11. The vehicle loading ramp system of claim 10 wherein the first end portion and the second end portion of the support post assembly are securable to one another at a plurality of positions and such that a longitudinal axis of the first end portion and longitudinal axis of the second end portion extend in crossing directions relative to one another.

12. The vehicle loading ramp system of claim 7 wherein a rearward facing end portion of the mounting assembly defines a receiver constructed to slideably receive structures configured to engage a receiver secured to a vehicle.

13. The vehicle loading ramp system of claim 7 wherein the mounting assembly includes a lock arrangement that is operable to wedge a hitch pin into engagement with the mounting assembly and the receiver secured to a vehicle.

14. The vehicle loading ramp system of claim 13 wherein the lock arrangement is operable from a rearward facing direction when the mounting assembly is engaged with the receiver secured to a vehicle.

15. A vehicle receiver supported ramp system comprising:
a mounting assembly that is constructed to removably cooperate with a vehicle hitch receiver;
a support post pivotally connected to the mounting assembly;
a cross bar connected to the support post at a location that is offset from the mounting assembly such that a first portion of the cross bar and a second portion of the cross bar are oriented on opposite lateral sides of the support post; and
a first ramp section and a second ramp section that are each constructed to slideably and pivotably cooperate with each of the first portion and the second portion of the cross bar such that the first ramp section and the second ramp section can each be selectively engaged with one of the first portion and the second portion of the cross bar to define a plurality of wheel base dimensions defined by a distance between the first ramp section and the second ramp section when the ramp sections are engaged with the cross bar,
wherein the support post supports the cross bar, while the cross bar supports the first and second ramp sections, while pivoting between a stowed position wherein the support post is oriented nearer a rear portion of a vehicle and a deployed position wherein the support post is rotated away from the rear portion of the vehicle,
wherein the first and second ramp sections each include a first ramp portion and a second ramp portion that are pivotably connected to one another such that an axis of rotation between the first ramp portion and the second ramp portion is oriented generally vertically above an axis of rotation between the first and second ramp sections and the cross bar when in the stowed position,
wherein the first ramp portion of each of the first and second ramp sections includes a first end defined by a mount tube that is pivotably connected to the cross bar so as to provide a smooth transition from the first ramp portion to a rear portion of a vehicle with the mount tube therebetween when in the deployed position and a second end distal to the first end in a longitudinal direction of the first ramp portion that is pivotably connected to the second ramp portion, and
wherein the mount tube of the first ramp portion of each of the first and second ramp sections is configured to slideably cooperate with the cross bar, and
wherein the mounting assembly further comprises a plurality of stops that extend laterally between plates of the mounting assembly and define a maximum relative rotation of the support post.

16. The vehicle receiver supported ramp system of claim 15 further comprising a first collar and a second collar that each removably cooperate with a respective one of the first portion and the second portion of the cross bar and which can be oriented laterally inboard or laterally outboard of a respective one of the first ramp section and the second ramp section associated with the same portion of the cross bar.

17. The vehicle receiver supported ramp system of claim 16 further comprising a respective pin associated with a respective one of each of the first portion and the second portion of the cross bar, each respective pin configured to prevent at least one of translation or rotation of a respective one of the first ramp section and the second ramp section and a respective one of the first collar and the second collar associated with a respective one of the first portion and the second portion of the cross bar when the respective pin is engaged therewith.

18. The vehicle receiver supported ramp system of claim 15 further comprising a lock assembly that is operable to restrict removal of a hitch pin associated with securing the mounting assembly to the vehicle hitch receiver.

19. The vehicle receiver supported ramp system of claim 15 wherein the mounting assembly includes a forward facing portion that slideably cooperates with the vehicle hitch receiver and a rearward facing portion that defines a receiver tube that defines an opening having a shape that is similar to an exterior shape of the forward facing portion of the mounting assembly.

20. The vehicle ramp system of claim 1 wherein the mounting assembly further comprises a plurality of holes that facilitate selective placement of the mounting assembly along a longitudinal direction relative to a vehicle hitch receiver.

* * * * *